United States Patent
Silverbrook et al.

(10) Patent No.: US 6,741,871 B1
(45) Date of Patent: May 25, 2004

(54) MOBILE PHONE WITH INTERACTIVE PRINTER

(75) Inventors: Kia Silverbrook, Balmain (AU); Paul Lapstun, Rodd Point (AU); Tobin Allen King, Cremorne (AU)

(73) Assignee: Silverbrook Research Pty Ltd, Balmain (AU)

( * ) Notice: Subject to any disclaimer, the term of this patent is extended or adjusted under 35 U.S.C. 154(b) by 526 days.

(21) Appl. No.: 09/721,892

(22) Filed: Nov. 25, 2000

(30) Foreign Application Priority Data

Dec. 1, 1999 (AU) .............................. PQ 4392

(51) Int. Cl.[7] .............................................. H04B 1/38
(52) U.S. Cl. ................ 455/557; 455/556.1; 400/62; 358/1.15; 358/402
(58) Field of Search ................ 455/557, 550, 455/554.2, 556.1; 347/5; 358/402, 1.15; 400/104, 62

(56) References Cited

U.S. PATENT DOCUMENTS

| | | |
|---|---|---|
| 5,051,736 A | 9/1991 | Bennett et al. |
| 5,208,446 A | 5/1993 | Martinez |
| 5,325,418 A | 6/1994 | McGregor et al. |
| 5,334,824 A * | 8/1994 | Martinez ................ 705/41 |
| 5,477,012 A | 12/1995 | Sekendur |
| 5,625,669 A | 4/1997 | McGregor et al. |
| 5,652,412 A | 7/1997 | Lazzouni |
| 5,661,506 A | 8/1997 | Lazzouni |
| 5,692,073 A | 11/1997 | Cass |
| 5,838,798 A | 11/1998 | Stevens, III |
| 5,852,434 A | 12/1998 | Sekendur |
| 6,076,734 A | 6/2000 | Dougherty et al. |
| 6,445,932 B1 * | 9/2002 | Soini et al. ............ 455/556.1 |

FOREIGN PATENT DOCUMENTS

| | | |
|---|---|---|
| GB | 2 306 669 | 5/1997 |
| WO | WO 99/18487 | 4/1999 |
| WO | WO 99/50787 | 10/1999 |

\* cited by examiner

Primary Examiner—Nay Maung
Assistant Examiner—Alan T. Gantt

(57) ABSTRACT

A mobile telephone (1) may act as a base station for a machine readable code sensor pen (62) to enable connection of the pen (62) with a computer system. The telephone (1) may also include a sensor (80) for sensing the machine readable code and/or a printer (12), for mobile printing of coded substrates.

8 Claims, 15 Drawing Sheets

MOBILE PHONE WITH INTERACTIVE PRINTER

CO-PENDING APPLICATIONS

Various methods, systems and apparatus relating to the present invention are disclosed in the following pending applications filed by the applicant or assignee of the present invention on Nov. 25, 2000:

Ser. Nos. 09/721,895, 09/721,894, 09/722,174, 09/721,896, 09/722,148, 09/722,146, 09/721,861, 09/721,892, 09/722,171, 09/721,858, 09/722,142, 09/722,087, 09/722,141, 09/722,175, 09/722,147, 09/722,172, 09/721,893, 09/722,088, 09/721,862, U.S. Pat. No. 6,530,339, Ser. Nos. 09/721,857, 09/721,859, 09/721,860.

The disclosures of these co-pendine applications are incorporated herein by cross-reference.

Various methods, systems and apparatus relating to the present invention are disclosed in the following co-pending applications filed by the applicant or assignee of the present invention on Oct. 20, 2000:

Ser. Nos. 09/693,415, 09/693,219, 09/693,280, 09/693,515, 09/693,705, 09/693,647, 09/693,693, 09/693,593, U.S. Pat. No. 6,474,888, Ser. Nos. 09/693,341, 09/696,473, 09/696,514, 09/693,301, U.S. Pat. No. 6,454,482, Ser. No. 09/693,704, U.S. Pat. Nos. 6,527,365, 6,474,773, Ser. No. 09/693,335.

The disclosures of these co-pending applications are incorporated herein by reference.

Various methods, systems and apparatus relating to the present invention are disclosed in the following co-pending applications filed by the applicant or assignee of the present invention on Sep. 15, 2000:

Ser. Nos. 09/663,579, 09/669,599, 09/663,701, 09/663,640.

The disclosures of these co-pendine applications are incorporated herein by reference.

Various methods, systems and apparatus relating to the present invention are disclosed in the following co-pending applications filed by the applicant or assignee of the present invention on Jun. 30, 2000:

Ser. Nos. 09/609,139, 09/608,970, 09/609,039, 09/607,852, 09/607,656, 09/609,132, 09/609,303, 09/610,095, 09/609,596, 09/607,843, 09/607,605, 09/608,178, 09/609,553, 09/609,233, 09/609,149, 09/608,022, 09/609,232, 09/607,884, U.S. Pat. No. 6,457,883, Ser. Nos. 09/608,920, 09/607,985, U.S. Pat. Nos. 6,398,332, 6,394,573, Ser. No. 09/606,999.

The disclosures of these co-pending applications are incorporated herein by reference.

Various methods, systems and apparatus relating to the present invention are disclosed in the following co-pending applications filed by the applicant or assignee of the present invention on 23 May 2000:

Ser. Nos. 09/575,197, 09/575,195, 09/575,159, 09/575,132, 09/575,123, 09/575,148, 09/575,130, 09/575,165, 09/575,153, 09/575,118, 09/575,311, 09/575,116, 09/575,144, 09/575,139, 09/575,186, 09/575,185, 09/575,191, 09/575,145, 09/575,192, 09/609,303, 09/610,095, 09/609,596, 09/575,181, 09/575,193, 09/575,156, 09/575,183, 09/575,160, 09/575,150, 09/575,169, 09/575,184, U.S. Pat. No. 6,502,614, Ser. Nos. 09/575,180, 09/575,149, U.S. Pat. No. 6,549,935, Ser. Nos. 09/575,187, 09/575,155, U.S. Pat. Nos. 6,591,884, 6,439,706, Ser. Nos. 09/575,196, 09/575,198, 09/575,178, U.S. Pat. Nos. 6,428,155, Ser. Nos. 09/575,146, 09/608,920, 09/575,174, 09/575,163, 09/575168, 09/575,154, 09/575,129, 09/575,124, 09/575,188, 09/575,189, 09/575,162, 09/575,172, 09/575,170, 09/575,171, 09/575,161, 10/291,716, U.S. Pat. Nos. 6,428,133, 6,527,365, 6,315,399, 6,338,548, 6,540,319, 6,328,431, 6,328,425, Ser. No. 09/575,127, U.S. Pat. No. 6,383,833, 6,464,332, 6,390,591, Ser. No. 09/575,152, U.S. Pat. Nos. 6,328,417, 6,409323, 6,281,912, 6,604,810, Ser. No. 09/575,112, U.S. Pat. No. 6,488,422, Ser. Nos. 09/575,108, 09/575,109, 09/575,110.

The disclosures of these co-pending applications are incorporated herein by reference.

FIELD OF INVENTION

The present invention relates generally to devices for interacting with computer systems, and in particular, to a mobile phone incorporating a printer for printing interface surfaces.

BACKGROUND

Demand for wireless access to interactive information and applications via mobile phones is increasing, due in large part to expectations created by wired access to the Internet. While bandwidth limitations are being addressed by third-generation mobile technology, the constrained user interfaces of mobile phones are an intrinsic impediment to usability, and this problem is only exacerbated by shrinking form factors.

The present invention utilizes methods, systems and devices related to a system referred to as "netpage", described in our co-pending applications listed above, wherein invisible coded data is disposed on various surfaces to render the surfaces interactive in the manner of graphical user interfaces to computer systems.

SUMMARY OF INVENTION

The present invention, in its various embodiments, provides a mobile telephone which incorporates a number of netpage systems to increase the utility of the netpage system.

In one form the invention is a mobile telephone which has a first transceiver (or a separate transmitter and receiver) for communication on the phone's mobile telephone network and a second transceiver (or a separate transmitter and receiver) for communicating with a netpage pen or similar device. The pen transmits data to and receives data from the netpage system via the mobile telephone and the mobile telephone system.

The mobile telephone may include a printer whereby information may be printed on demand. The printer may be an ordinary printer or a netpage enabled printer.

The mobile telephone may incorporate a netpage sensor so that the user may use the telephone to interact with netpage directly without the need for a separate netpage sensor pen. The mobile telephone still uses the mobile telephony network to communicate with the netpage system. Alternately, the phone may have a separate transceiver. The telephone may include both a netpage sensor and a netpage printer.

Where the telephone incorporates a netpage sensor and/or a netpage printer it may still act as a base station/relay station for other netpage sensor pens.

Preferably the telephone will only act as a base station/relay station for netpage pens registered to the telephone's user and will not interact with other user's netpage pen.

Accordingly, in a first broad form, the invention provides a mobile telephone device including:
- a mobile telephone unit including:
  - a first transmitter for transmitting signals over a mobile telephony system, and
  - a first receiver for receiving signals from a mobile telephony system;
  - a first sensor device for sensing coded data and for outputting raw data based on said sensed data; and
  - a transmitter controller operable to control the first transmitter to transmit output data based at least partially on said sensed data via the mobile telephony system to a computer system.

In a second broad form the invention provides a mobile telephone device including:
- a mobile telephone unit including:
  - a first transmitter for transmitting data over a mobile telephony network;
  - a first receiver for receiving data from a mobile telephony network;
- a second transmitter and a second receiver for transmitting data to and receiving data from one or more sensor devices, the sensor devices transmitting data;
- control means operable to control said first transmitter to transmit data received by the second receiver from one or more sensor devices to a computer system via the mobile telephony network.

In a third broad form the invention provides a mobile telephone device including:
- a mobile telephone unit including:
  - a first transmittal for transmitting data to a mobile telephony network;
  - a first receiver for receiving data from a mobile telephony network;
  - a printer mechanism for receiving document data and printing an interface onto a surface, the interface being at least partially based on the document data, the document data including identity data indicative of at least one identity, the identity being associated with a region of the interface, the interface including coded data In a fourth broad form the invention provides a mobile telephone device including:
- a mobile telephone unit including:
  - a first transmitter for transmitting signals over a mobile telephony system, and
  - a first receiver for receiving signals from a mobile telephony system;
  - a first sensor device for sensing coded data and for outputting raw data corresponding to said sensed data;
  - a transmitter controller operable to control the first transmitter to transmit output data based at least on the raw data via the mobile telephony system to a computer system, and
  - a printing mechanism capable of printing an interface which includes information visible to the unaided eye of the average human and machine readable information which is invisible to the unaided eye of the average human.

BRIEF DESCRIPTION OF DRAWINGS

Notwithstanding any other forms which may fall within the scope of the present invention, preferred forms of the invention will now be described, by way of non-limiting example only, with reference to the accompanying drawings in which.

DETAILED DESCRIPTION OF PREFERRED AND OTHER EMBODIMENTS

In both embodiments, there is provided a mobile phone having an internal detachable printer which includes a separately detachable printhead and ink distribution unit assembly and further a preferably separately detachable paper or other print media supply. The mobile phone printer of at least the first preferred embodiment is of a standard size thereby conferring a high level of convenience during operation. The primary differences between the two embodiments relate to form of the print media and the location of the ink supply. However the inclusion of a printer is not essential to the invention. A third possible embodiment, featuring a manually-fed rather than cartridge-based paper supply, is described in our earlier application U.S. Ser. No. 09/436,589, the contents of which are herein incorporated by cross-reference.

Figure 1:
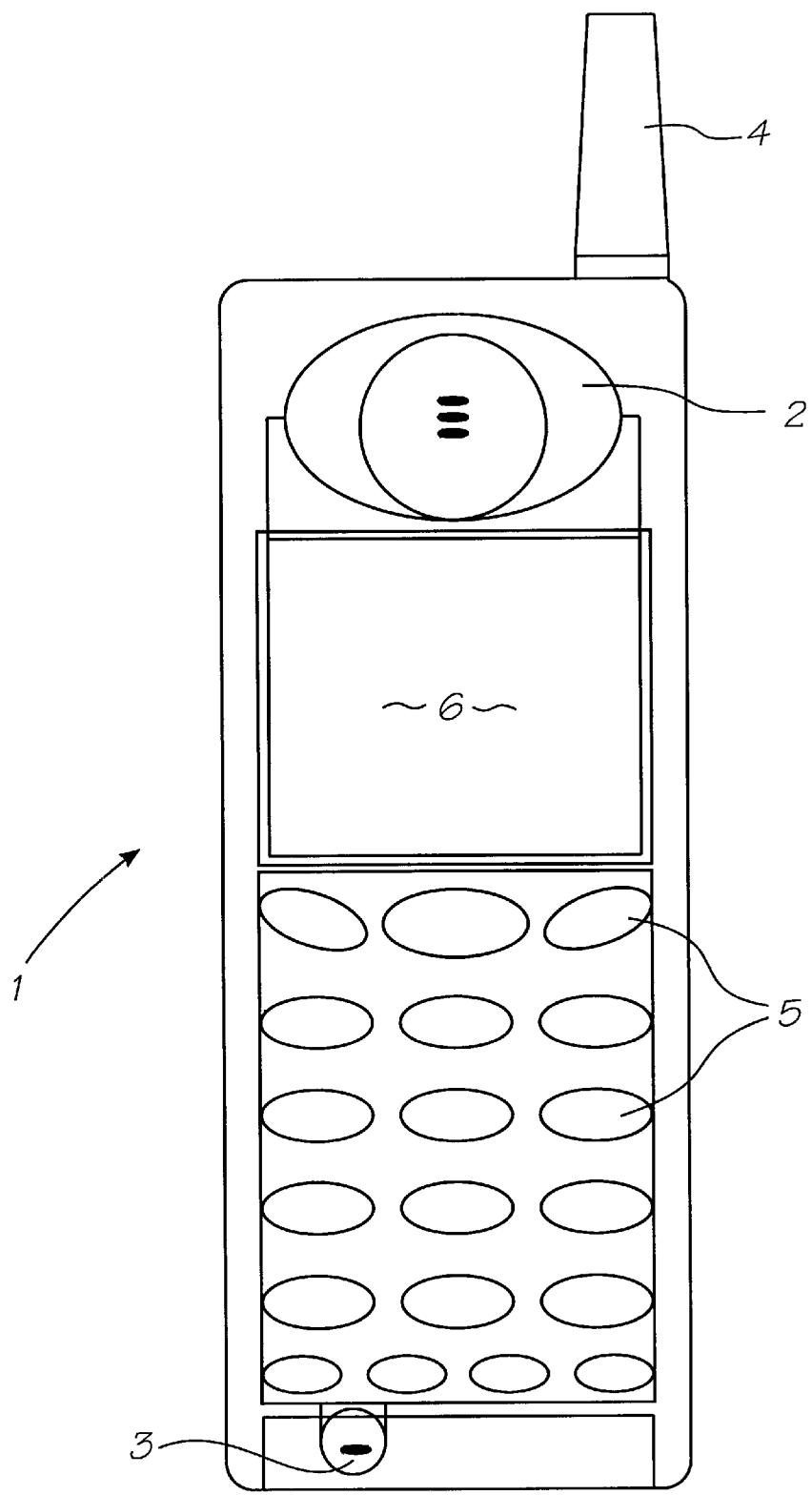
FIG. 1 is a front view of a first preferred embodiment.

Turning initially to FIG. 1, there is illustrated the first preferred embodiment printer phone 1 which looks like a conventional mobile phone including an earpiece 2, microphone 3, aerial 4, a series of push buttons 5 and a preferably color LCD screen 6 for the display of information.

Figure 2:
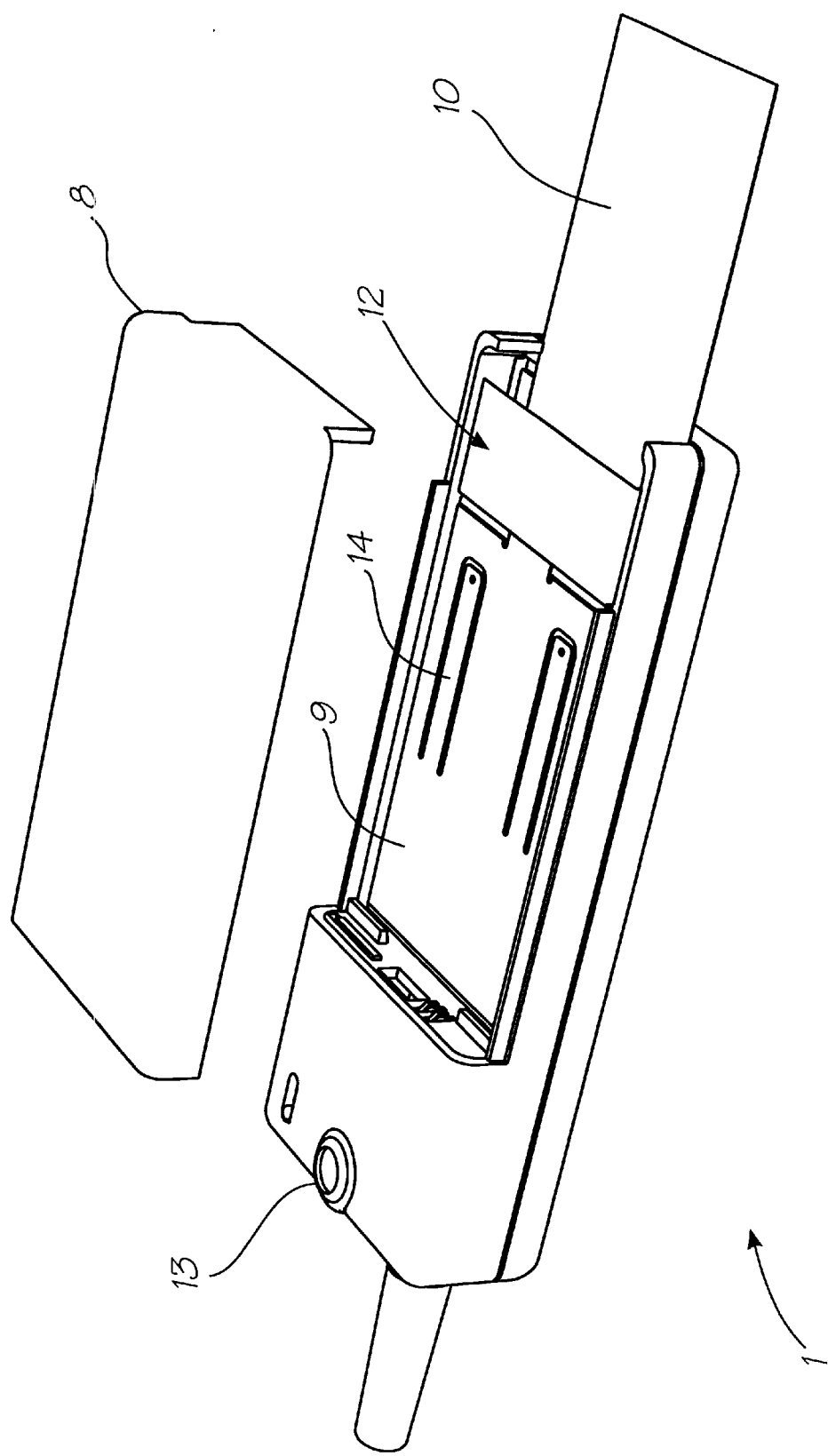
FIG. 2 is an exploded perspective view of the rear of the first embodiment.

In FIG. 2, the back portions of the first embodiment phone 1 is shown with the battery cover 8 removed so as to reveal a print media stock container 9 from which business card sized cards or sheets 10 are used on which to print images on by a printer unit 12. The print out onto the card can be processed signal information downloaded via the mobile phone 1 such as e-mail or other facilities.

The mobile phone is equipped with a netpage sensor 80 which can comprise, for example, a CCD or CMOS sensor designed to sense netpage tags on demand so that the mobile phone 1 can effectively act as a netpage sensor for interactive use with netpage pages.

The netpage sensor device is similar to the netpage sensor pen disclosed in our co-pending applications U.S. Ser. No. 09/575,174 and U.S. Ser. No. 09/721,893 referred to earlier, and utilizes similar electronic circuitry to process sensed tags.

It will be appreciated that the sensor need not be located on the rear surface of the phone but may be placed anywhere. For example, the sensor may be located on a corner of the phone, so that the phone can be held and used in a pen-like manner.

Figure 3:
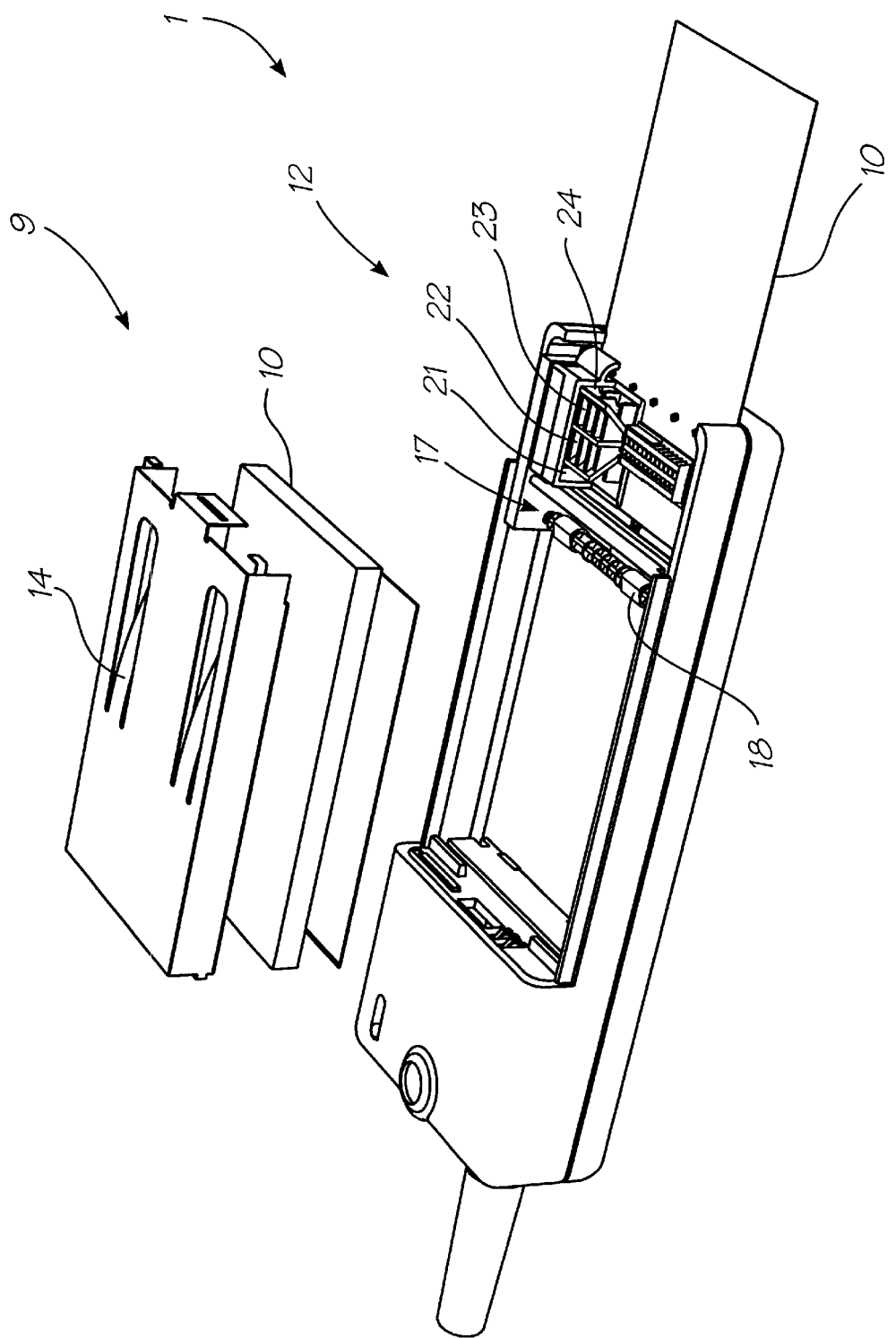
FIG. 3 is a further exploded perspective view, partly in section, of the first embodiment showing more detail of the internal structures.
Figure 4:
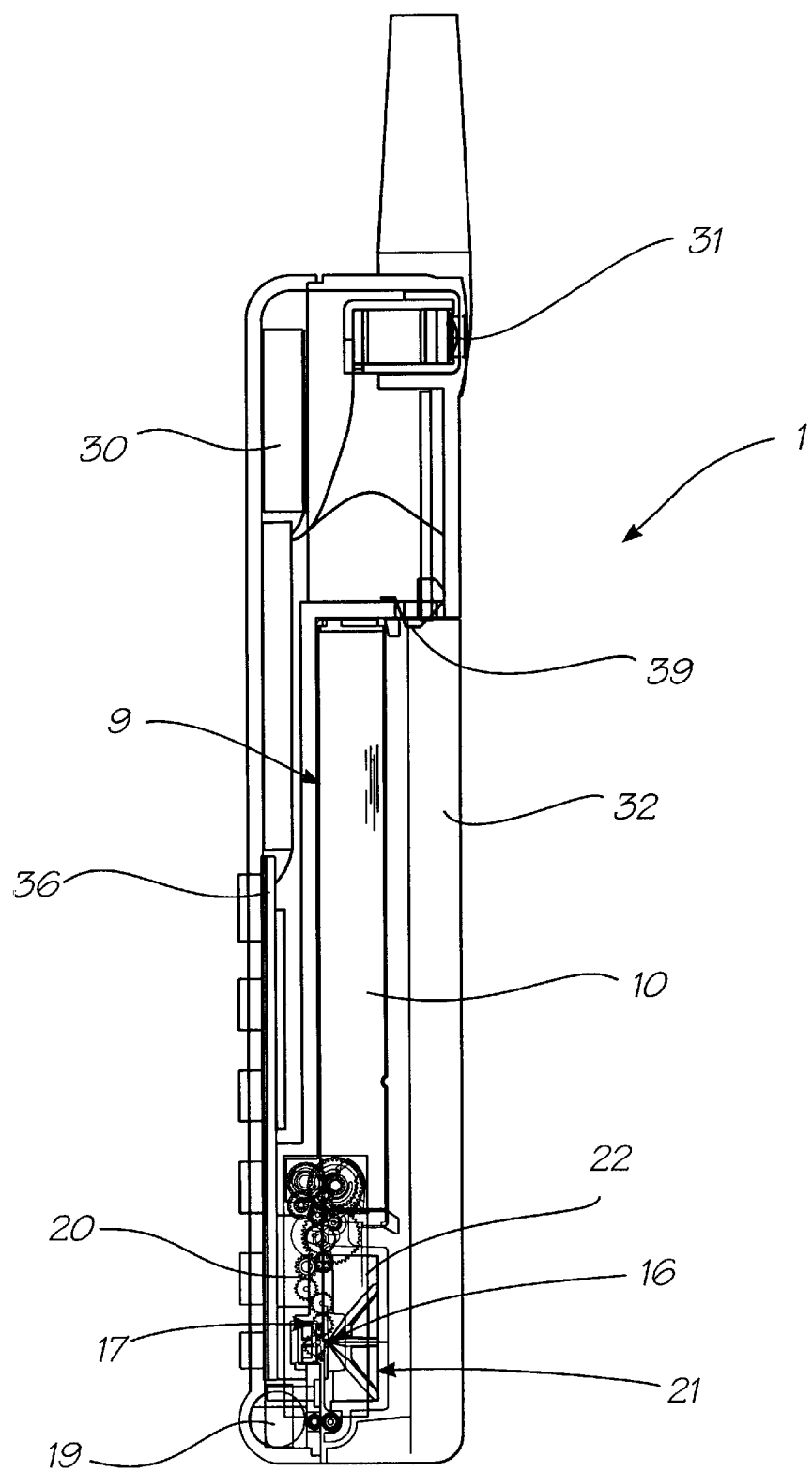
FIGS. 4 and 5 are sectional rear and side views of the first embodiment respectively.

In FIG. 3, there is illustrated an exploded perspective view, partly in section, of the first mobile phone device 1 showing more detail of the printer assembly 12 including the printhead assembly 16 and feed means 17. The paper stock container 9 includes a series of cards 10 which are resiliently compressed by means of leaf springs 14. As shown in the other figures, the print media feed means 17 are provided in the form of pinch rollers 18 which are driven by motor 19 via gear train 20 and which is used to drive individual cards 10 to and past the printhead 16. The printhead may form part of an optionally replaceable printhead and ink distribution unit assembly 21 including an ink distribution unit 22 and can be substantially the same as that disclosed in our earlier application U.S. Ser. No. 09/425,419 filed Oct. 19, 1999, the contents of which are hereby incorporated by cross-reference.

The printer assembly 12 is preferably a netpage printer which operates, and is controlled in a similar manner to the wall- or desk-mounted netpage printers as disclosed in our co-pending application U.S. Ser. No. 09/722,142.

Figure 5:
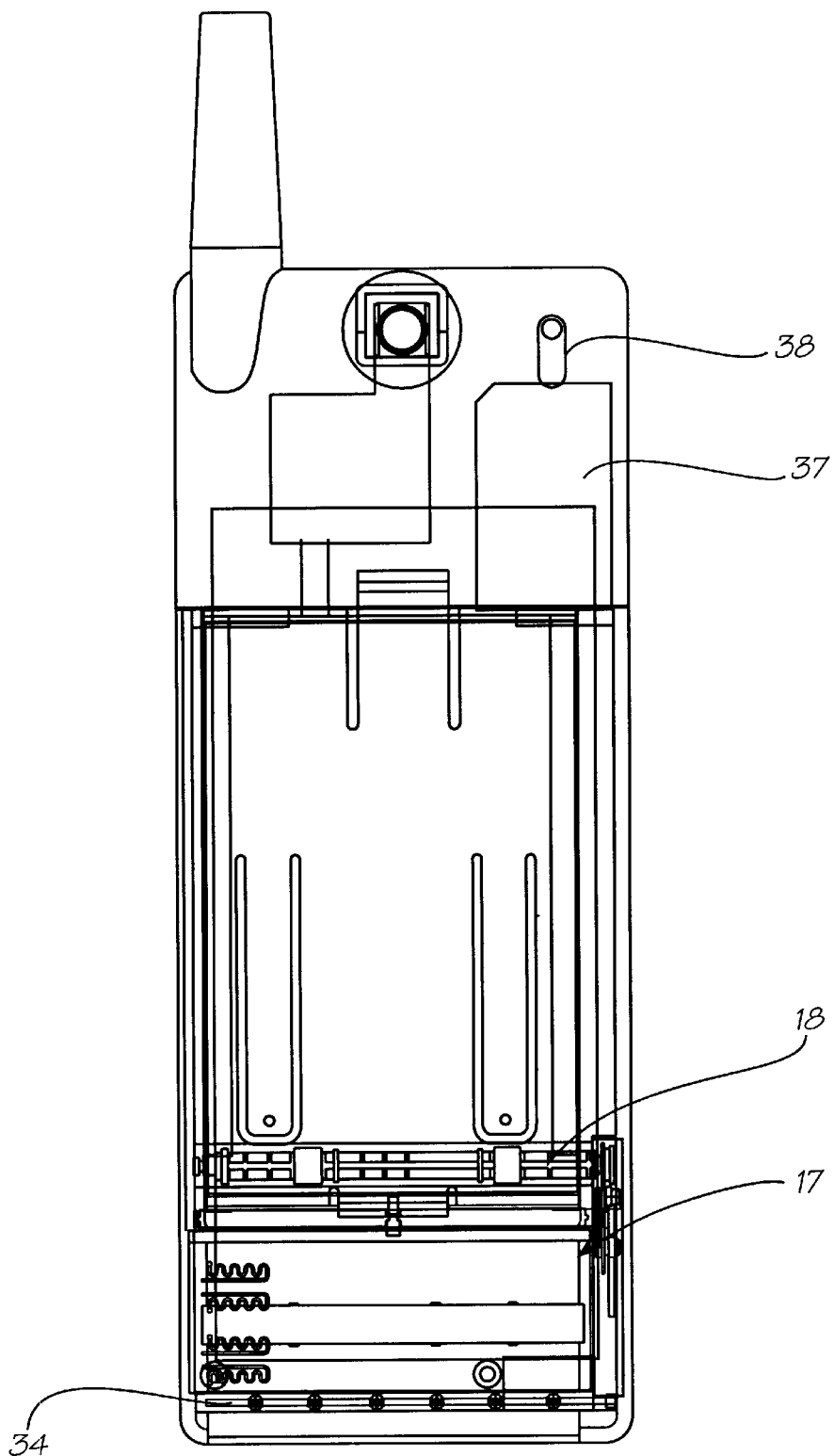
Figure 6:
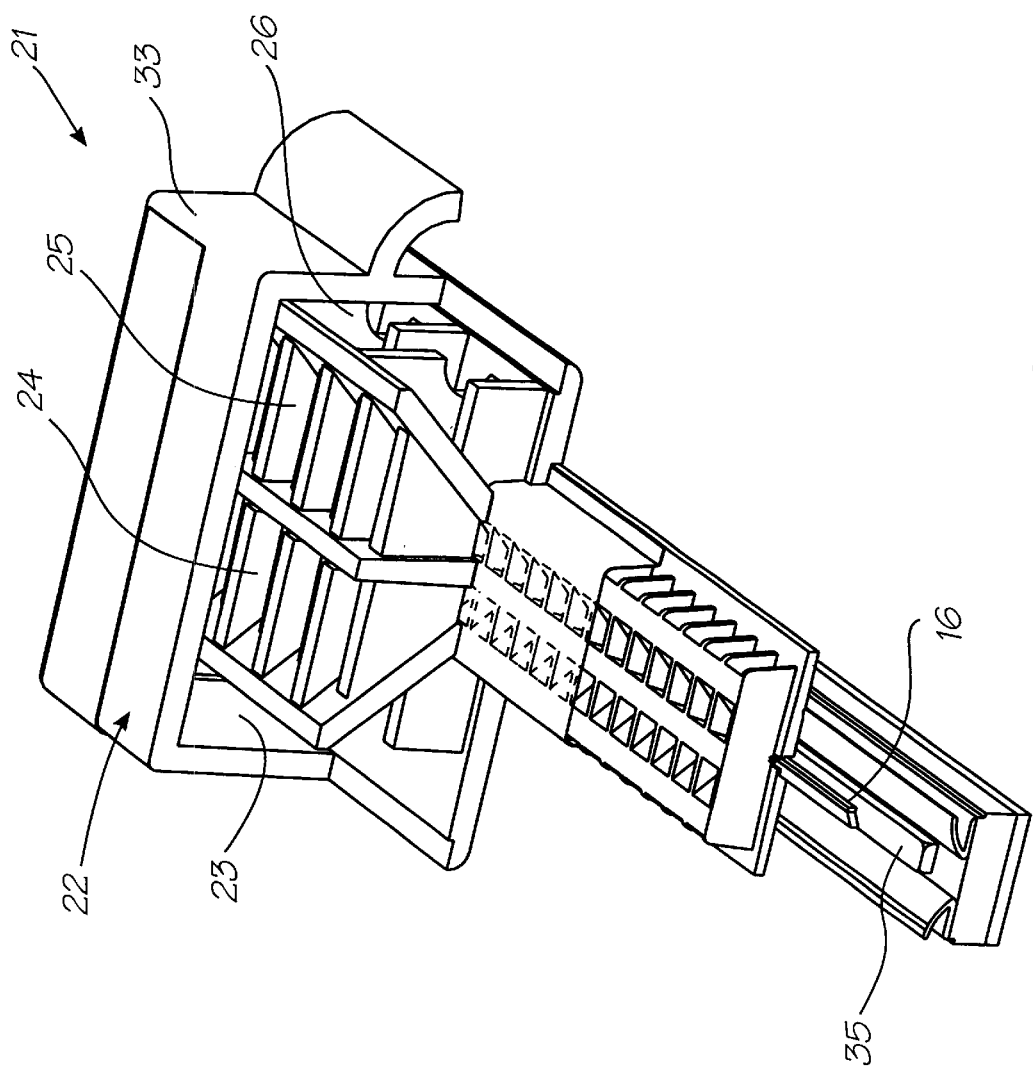
FIG. 6 is a sectional perspective view of the print apparatus of the first embodiment.

The ink distribution unit 22 of this first embodiment includes a series of ink supply reservoirs 23 to 26 which are provided for full color printing. The reservoir 23 is substantially larger than the reservoirs 22 to 26 and can be utilized to store black ink. It is estimated that the ink supply will be sufficient for printing of approximately 2000 pages at 15% coverage of black or 200 photos of 50% coverage of CMYK. A more detailed view of the printer assembly 12 is illustrated in FIG. 5 with an expanded technical description being disclosed in the aforementioned provisional patent specification.

Figure 7:
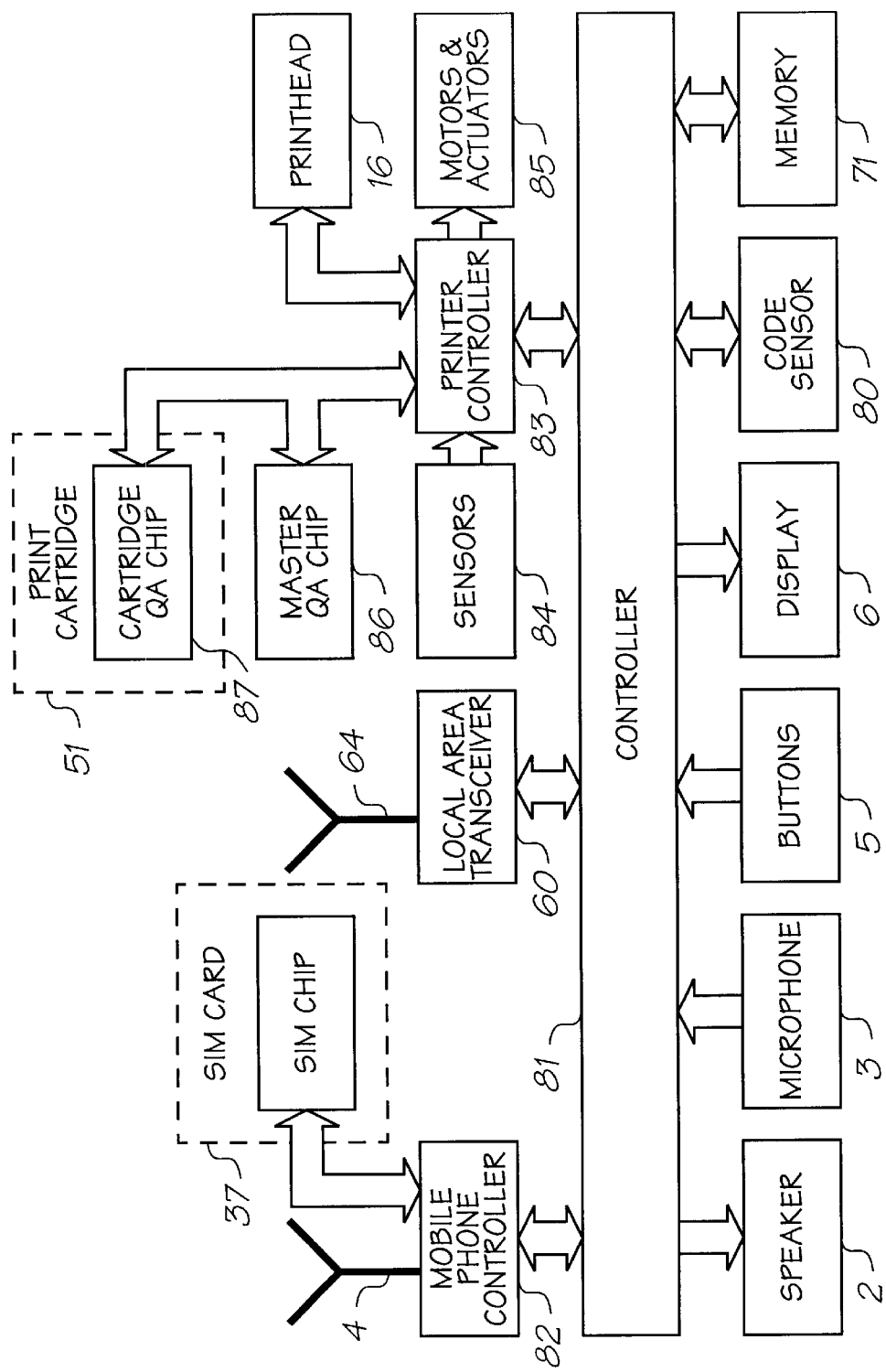
FIG. 7 is a schematic block diagram showing the components of and electrical interconnections for the first embodiment and a second embodiment of the invention, including optional components.
Figure 8:
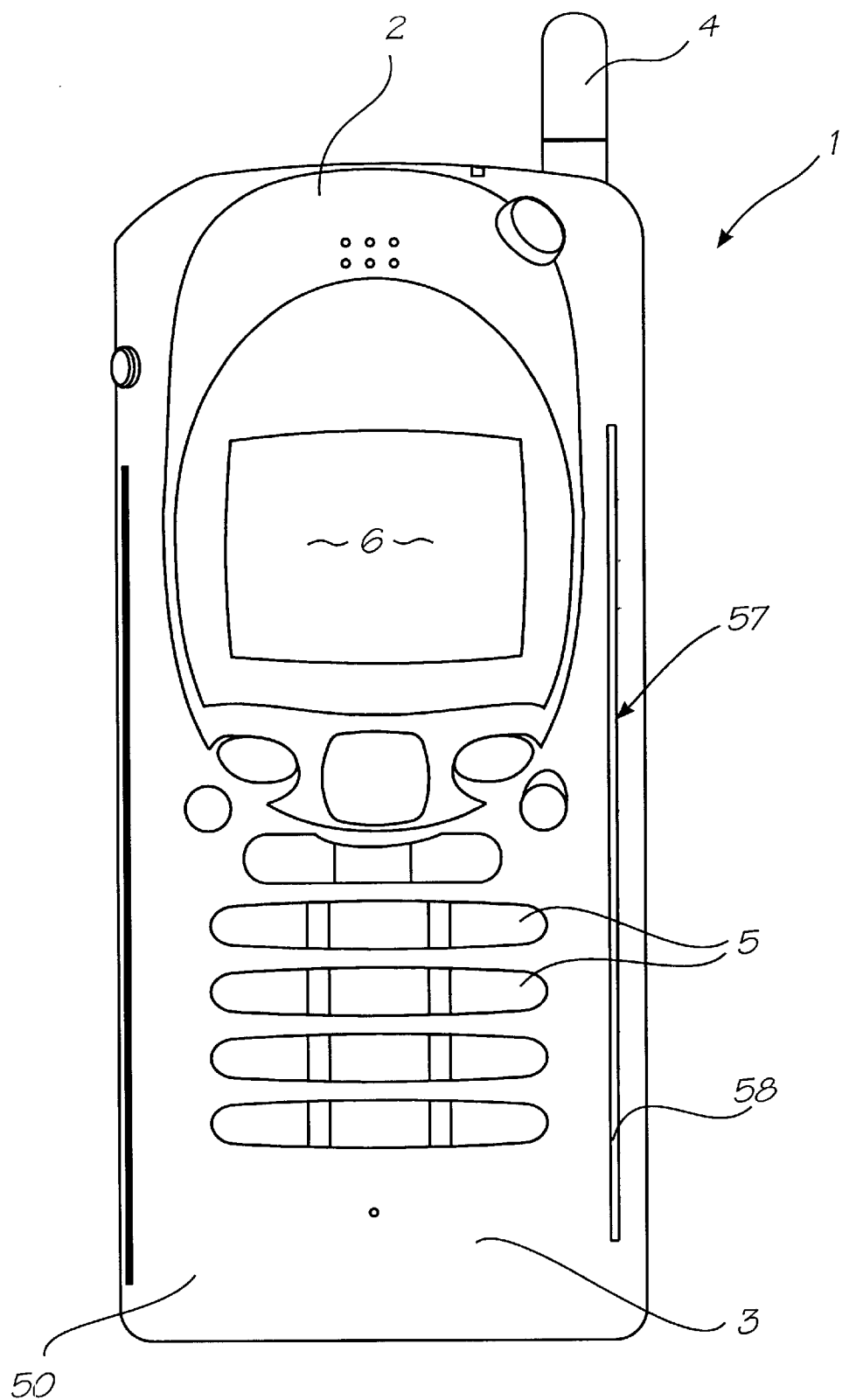
FIG. 8 is a front view of a second preferred embodiment utilizing a paper and ink cartridge and having a scanning facility.
Figure 9:
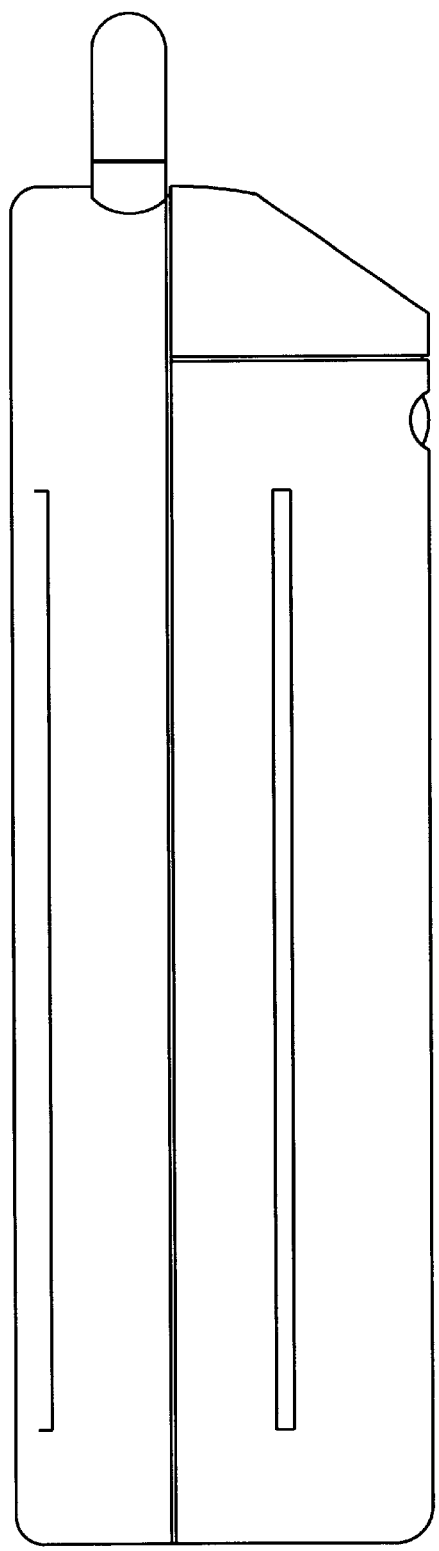
FIG. 9 is a right hand side view of the second embodiment printer phone shown in FIG. 8.
Figure 10:
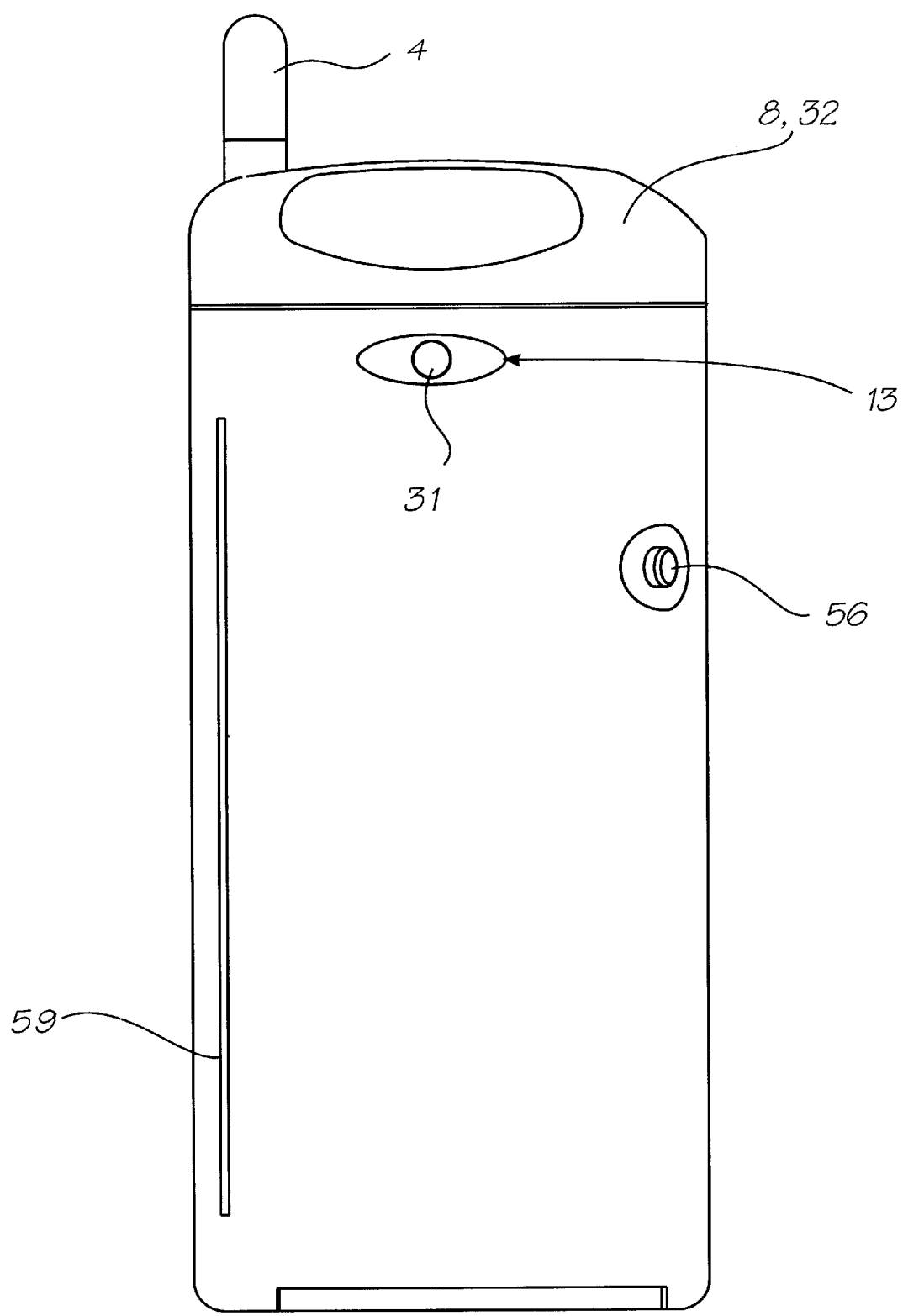
FIG. 10 is a rear view of the second embodiment printer phone shown in FIGS. 8 and 9.
Figure 11:
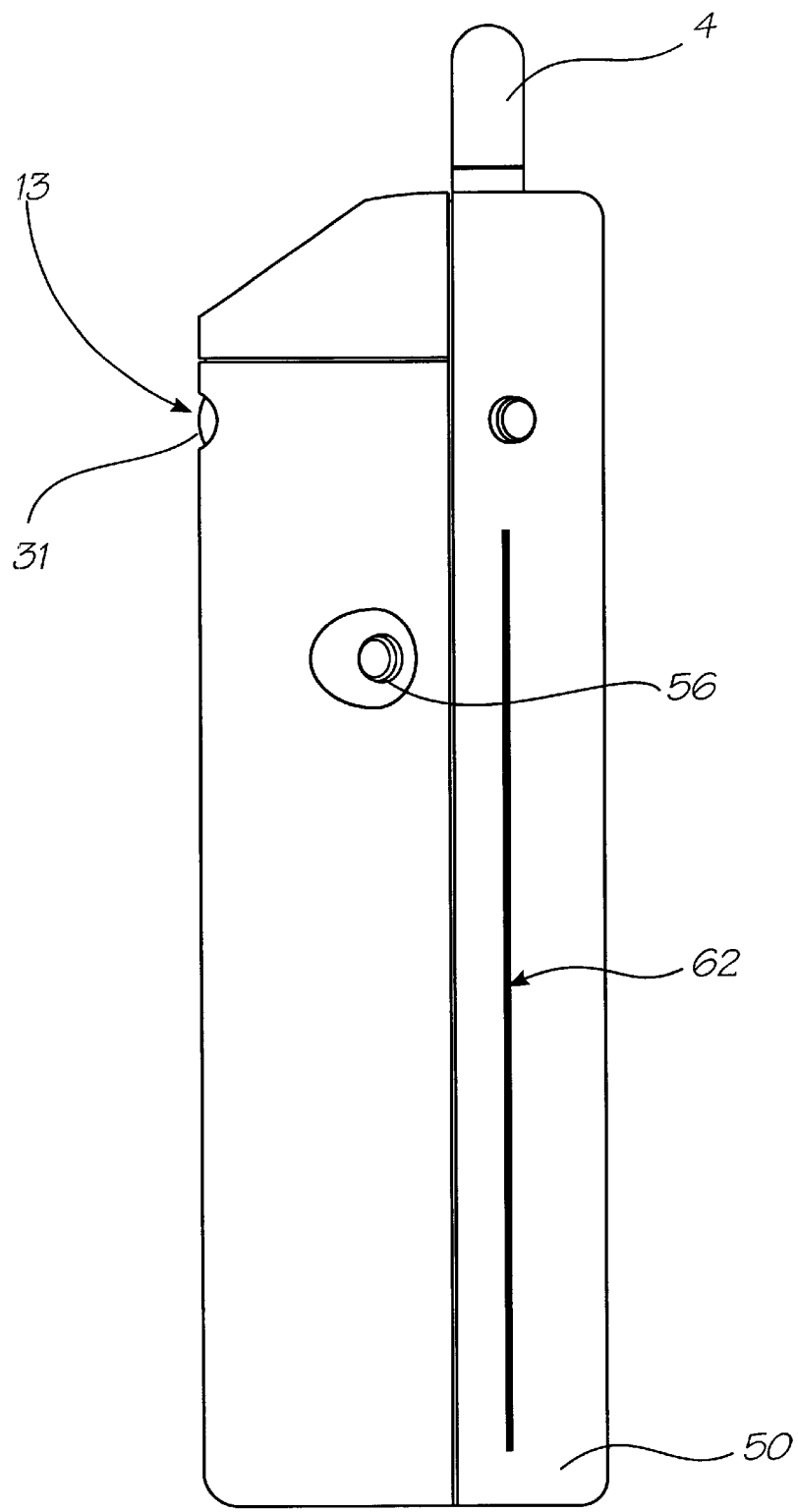
FIG. 11 is a left hand side view of the printer phone shown in FIG. 8.
Figure 12:
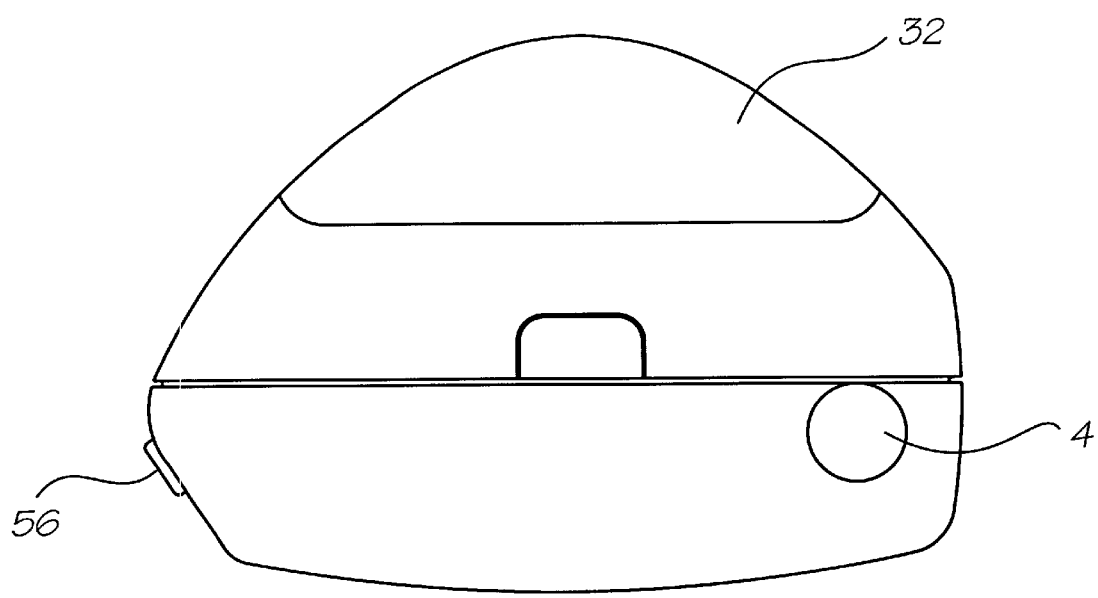
FIG. 12 is a top plan view of the printer phone shown in FIG. 8.
Figure 13:
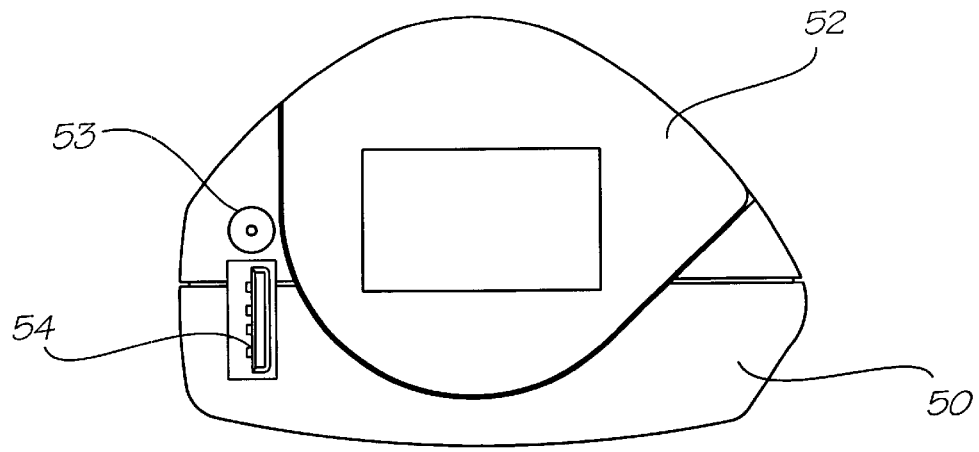
FIG. 13 is an inverted plan view of the printer phone shown in FIG. 8.
Figure 14:
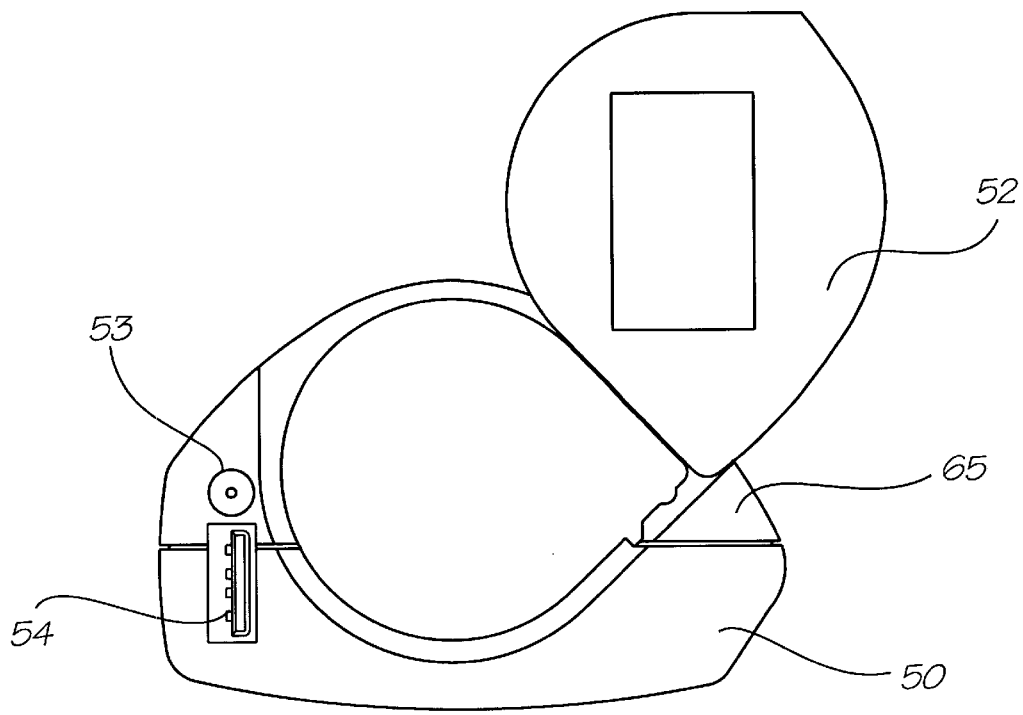
FIG. 14 is an inverted plan view as shown in FIG. 13 illustrated with the print roll hatch in the open position.

The mobile phone system can be operated electronically under the control of a series of one or more application specific integrated circuits (ASICS) which incorporate the usual mobile phone capabilities in addition to camera and image processing capabilities. A sample block diagram indicating the electrical interconnections for this first embodiment is shown in FIG. 7. A suitable adaptation of the system, as outlined in our PCT Patent Application PCT/AU98/00544, can be utilized in the design of the ASIC. Other alternative system designs can be incorporated in accordance with the knowledge of those skilled in this particular field.

Other features/components of the phone device, the function of which will be readily apparent, are identified in the accompanying illustrations by the following reference numerals.

| Reference Numeral | Feature/component |
|---|---|
| 30 | loud speaker |
| 31 | camera lens array |
| 32 | NiMh Battery |
| 33 | Printhead cover molding |
| 34 | Paper exit wheels |
| 35 | Printhead capping mechanism |
| 36 | Telephone PCB with buttons |
| 37 | SIM card |
| 38 | SIM card ejector |
| 39 | Battery contacts |

Figure 16:
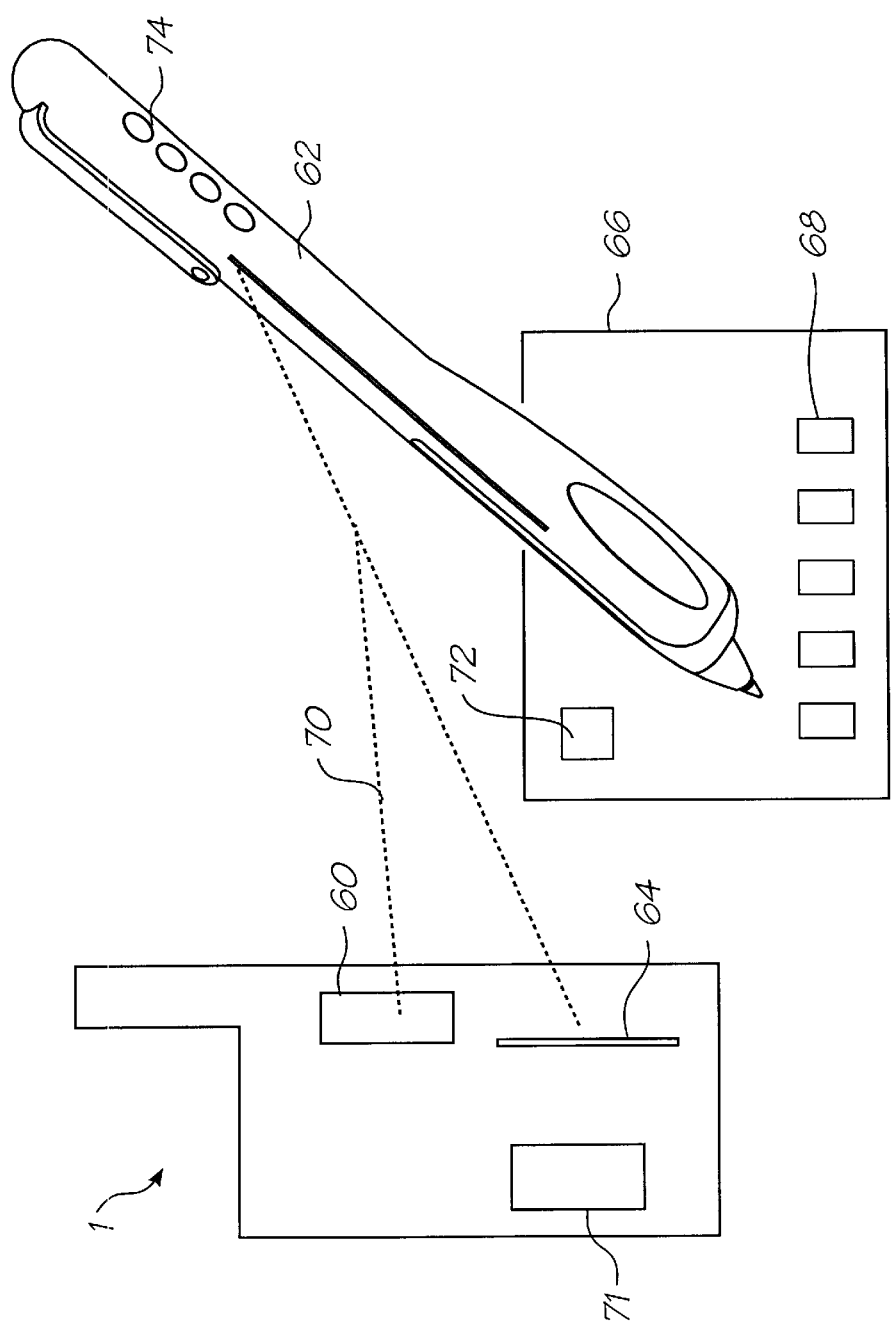
FIG. 16 schematically shows the interaction of a netpage pen with a telephone according to the invention.

The phone may also include a second transceiver 60 for interaction with a separate netpage pen 62, as illustrated in FIG. 16.

The telephone preferably includes user information stored in its sim card 37 such that it will only interact with netpage pens 62 registered to the same user. Alternatively all authentication, including pen authentication, may be carried out by the netpage network servers.

The mode of interaction between the telephone 1 and the netpage pen 62 is the same as that described between the pen and the netpage printer in our co-pending applications U.S. Ser. No. 09/575,187 and U.S. Ser. No. 09/722,142.

Accordingly, for this interaction the phone includes similar circuitry and components or similar functionality as the netpage printers described in these co-pending applications.

Communication between the telephone 1 and the netpage pen 62 is achieved by wireless means, such as infrared or radio transmission and may utilize the telephone's mobile telephony aerial 4 or a separate aerial 64. In most cases it is expected that separate aerials will be required due to the different frequencies used.

Operation

Telephone Base Station

Referring to FIG. 16 the telephone 1 acts as a base station for a separate netpage pen 62. The pen and telephone are both "owned" by the same user and so communicate with each other. The authentication of the pen with the telephone uses the authentication steps outlined in U.S. Ser. No. 09/575,187. The user uses the netpage pen 62 on a netpage 66 and the pen detects the netpage tags 68. These tags are decoded and the decoded information transmitted to the phone 1 via the wireless link 70 in a similar manner to that described in U.S. Ser. No. 09/575,187 in relation to the interaction between the pen and the netpage printer.

In contrast to a netpage printer, a mobile telephone is not always "connected" to the mobile telephony network. Present mobile telephones require the user to explicitly make a connection with the mobile telephony system; future generations of mobile telephone systems are expected to provide a permanent data channel to mobile phones, network coverage aside.

Transmission of Netpage Information

Transmission of netpage data can be initiated in one of four ways:

1) manually;
2) hyperlink-activation;
3) automatic connection; or
4) constantly.

Manual Transmission

In manual initiation the user carried out a series of actions of the pen 62 with the paper 66. The tags sensed and other information, such as pen force, is transmitted by the pen 62 to the telephone 1 via wireless link 70. This information is buffered by the telephone in on-board memory 71 until the user instructs the telephone to send the information. This may be by using the control panel's push buttons 5 or by clicking on an area 72 of the netpage 66 signifying "send now". Sending may also be initiated using controls on the pen 62.

Once transmission is initiated, the telephone dials or otherwise connects with the netpage server and transmits the buffered data via the mobile telephony system. The connection may be automatically closed at the end of transmission of the buffered information or may remain open. If the connection remains open, it may do so for a pre-set period of time, or indefinitely until manually terminated by the user or after a period of netpage inactivity, i.e. if no data is transmitted from the netpage pen to the telephone. Whilst the connection remains open any data transmitted by the netpage pen 62 is immediately transmitted by telephone 1 to the netpage system without significant buffering. Some buffering may be necessary to accommodate any bottlenecks in data transmission.

Hyperlinked Transmission

As discussed in our co-pending applications U.S. Ser. No. 09/575,187 and U.S. Ser. No. 09/722,142, the preferred form of the netpage system uses tags with some data bits reserved for specific functions, such as indicating an "active area" associated with a hyperlink or button. Clicking in an active area of the page can therefore cause initiation of transmission, i.e. it can cause the phone to establish a connection if necessary. The telephone may buffer input until the user "clicks" in an active area, i.e. on a hyperlink or button. On receipt of an active area function code, the telephone automatically connects to the netpage server as previously described. Again the connection may close after transmission of the buffered data or remain open for transmission of additional data.

Automatic Connection

In this scenario, as soon as a user commences using a netpage pen and data is transmitted to the telephone, a connection is made by the telephone to the netpage server without further user action. Since the connection is made as soon as use commenced, it is envisaged that the connection will remain open whilst the pen is being used, again with an option for manual disconnection or disconnection after a pre-set period of inactivity. Alternatively, the connection may be made after the buffer in the telephone reaches a pre-set threshold or after a period of inactivity, but without the need for the user to knowingly initiate the connection.

Constant Connection

Future generations of mobile telephones are expected to be permanently connected to the telephone or data network in relation to data transmission and for users to be charged for data transmission on a volume basis rather than on a time basis. In this scenario, any user action is transmitted from the pen 62 to the telephone 1 and then immediately to the netpage server without any buffering.

Printing

In the preferred embodiment the telephone includes a print assembly and more preferably a supply of media.

User interaction, whether using the telephone's netpage sensor 80 or a separate netpage pen, with a netpage system which requires printing of additional pages can result in the telephone printing such pages. Whilst the pages printed are smaller than normal A4-letter size paper, the netpage system may be configured to dynamically format pages for the page size of the printer selected. This formatting may include changing the information printed as well as the layout; pages printed by a telephone may lack images, for example.

Where the telephone lacks an in-built printer, printing may be routed to the user's default printer or another printer selected by the user. Alternatively printing may be held until explicitly requested by the user.

As illustrated in the block diagram in FIG. 7, the telephone may include a printer controller 83 for the purposes of controlling and feeding the printhead 16. The printer controller also monitors sensors 84, such as the paper pull sensor, and controls the paper transport motors and other actuators 85.

The printer controller 83 may be configured to verify the quality of the print cartridge (ink and/or paper) and monitor the consumption of the cartridge's consumable content. It may therefore utilize a master QA chip 86, such as described in our co-pending application U.S. Ser. No. 09/113,223, the contents of which are herein included by cross reference, to interrogate an identical QA chip 87 embedded in the print cartridge 51.

The printer controller itself may be a print engine/controller (PEC) as described in our co-pending application U.S. Ser. No. 09/575,108, the contents of which are herein included by cross reference. The PEC includes dedicated support for encoding and rendering netpage tags.

The printhead 16 may be a MEMS printhead such as that disclosed in our co-pending application U.S. Ser. No. 09/575,141, the contents of which are herein included by cross reference.

Audio Download

The integration of a telephone with the netpage system allows for simplified downloading and playing of audio files. The user may navigate using netpages to a directory of downloadable audio files. The user selects an audio file which is sent to the telephone. The telephone enters a "play" mode and plays the audio file using the telephone's earpiece speaker 2 or headphone(s) connected to the telephone. The audio file may be streamed to the telephone for one time use or downloaded and stored for later single or multiple playback.

Voice and Data Transmission

Preferably the telephone is capable of transmitting data and voice information simultaneously. This may be by using two separate connections with the telephony system or by utilizing a single connection for both data and voice. Thus, the user may hold a conversation with another person whilst using the netpage features available.

Built-in Sensor

The telephone has a netpage sensor 80 and accordingly, the telephone may be used as a netpage pen without using a separate pen. When using the sensor, tags are sensed and decoded as in the separate netpage pen. Decoded data and other data generated by the user's activity may be buffered in the telephone's memory or immediately transmitted using any one of the four scenarios previously discussed.

When the sensor 80 is used it will be appreciated that the telephone's netpage ID (equivalent to a pen ID or base station/printer ID) will be transmitted to the netpage servers. A single ID only is required even where the telephone includes both a printer and a sensor as the system will be aware that the device is capable of both printing and sensing. This does not preclude use of separate IDs for the sensor and printer.

Basic Version

Whilst the preferred embodiment of the invention is a telephone which incorporates a netpage sensor, netpage printer and can act as a base station for netpage pens, it will be appreciated that not all of these features are essential to the invention.

The telephone may lack one or two of the netpage sensor, printer and base station features and so, in its most basic form, acts as a relay station for separate netpage pens. With a printer and base station feature but no sensor it acts as a mobile netpage printer for use with a separate pen which communicates with the netpage system via telephony. With a sensor with or without the base station but no printer it acts as a mobile netpage pen system without needing a separate base station for connection to the netpage system.

Turning next to FIGS. 8 to 15, there is shown a second embodiment printer phone according to the invention. Wherever possible like reference numerals will be used to denote corresponding features.

The major differences between the two embodiments are that instead of having a card dispenser and printhead with integral ink supply, this second embodiment utilizes a replaceable combined paper and ink print roll cartridge. The cartridge can be substantially the same as that described in the applicant's earlier applications U.S. Ser. No. 09/113,073 "Digital Camera System with Integral Print Roll"; U.S. Ser. No. 09/113,053 "Print Media Roll and Ink Replaceable Cartridge"; U.S. Ser. No. 09/112,744 "Anisotropic Rigidity to Reduce Curl in Rolled Media"; U.S. Ser. No. 09/112,823 "Miniature Color Printer using Ink and Paper Cartridges"; and U.S. Ser. No. 09/112,783 "Ink and Media Cartridge with Axial Ink Chambers" the contents all of which are incorporated herein by cross reference.

Another difference resides in the optional inclusion of a scanning facility, which whilst described with reference to the second embodiment, could also be included in the first embodiment, although it is envisaged that in practice this facility is better suited for use with print media in the form of a print roll. Further, the additional space required to accommodate the scanning facility is less of a problem with the second embodiment which by design cannot be as compact as the first embodiment. More details of these different features are described below.

In the second embodiment, the phone casing 50 is configured to receive the paper and ink print roll cartridge 51 via a cartridge hatch 52 formed in the base of the phone. Also provided in the base of the phone are the usual DC in and USB connectors 53 and 54.

In this particular embodiment, the camera device 13 is located on the rear of the phone and is operable via a camera take button 56. The printer phone may also include a scanning head (not shown) in the form of a linear CMOS image sensor which is located within the right hand side of the casing adjacent an image scan path defined by a scanning image slot 57 having an entry 58 in the front of the phone and an exit 59 at the rear of the phone.

Figure 15:
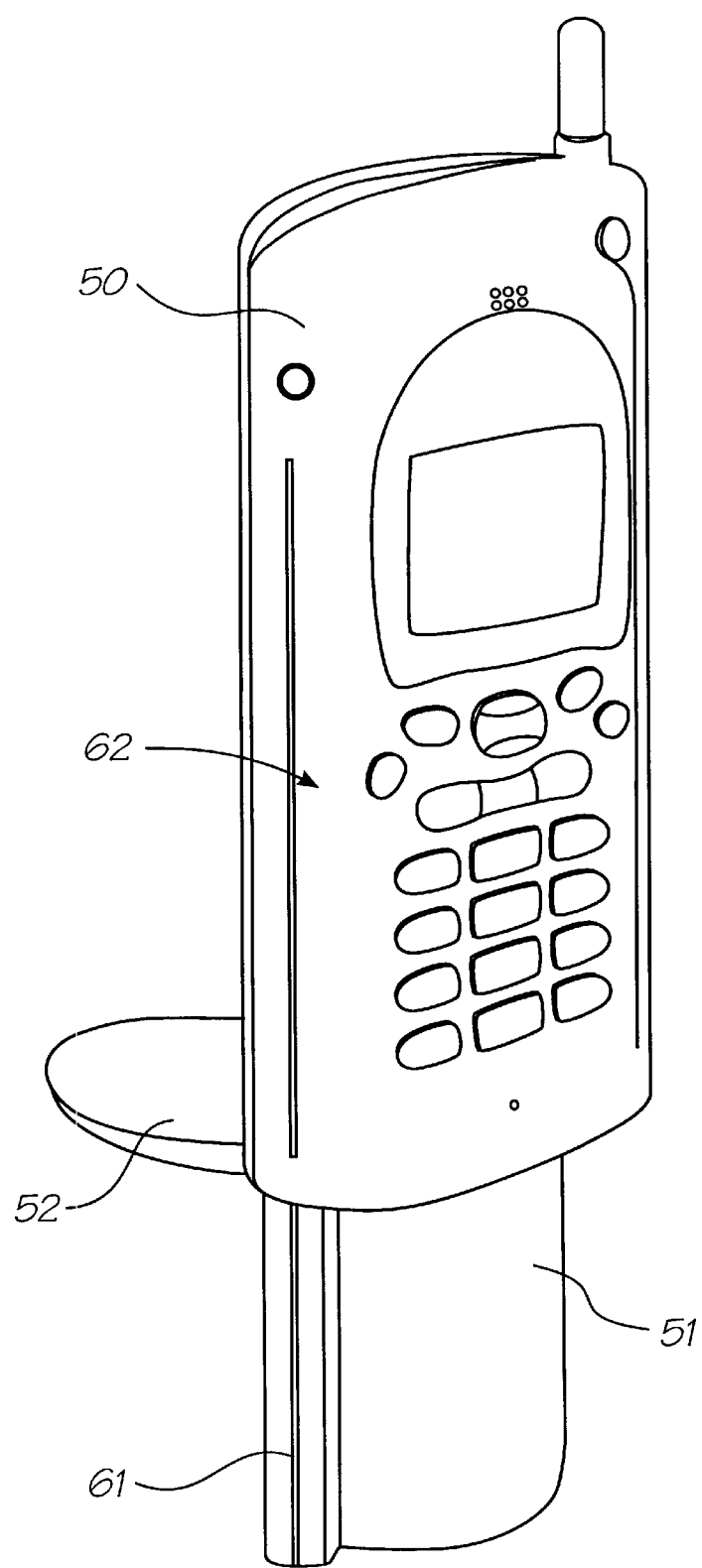
FIG. 15 is a perspective view of the printer phone of FIG. 8 illustrating insertion/removal of the print roll via the print roll hatch.

As can be best seen in FIG. 15, the paper and ink print roll cartridge 51 is of similar shape to a conventional 35 mm camera film cartridge, having a paper exit 61 which when installed aligns with a corresponding printer exit slot 62 formed in the front left hand side of the phone casing 50. However, the cartridge 51 is substantially longer, as it preferably contains sufficient print media and ink for 36 images, each 100 mm×150 mm, the customary size of a photographic print. The printhead and ink distribution unit assembly 21 is located behind the portion of the base molding identified at 65.

The second embodiment printer phone 1 can also be operated under the control of a series of one or more ASIC chips which incorporate the usual mobile phone capabilities in addition to camera and scanner image processing capabilities. Again, a suitable adaptation of the system as outlined in PCT Patent Application PCT/AU98/00544 filed by the present application can be utilized in the design of the ASIC chip.

In use, the operation of this second embodiment is very similar to that of the first with the exception of the additional scanner facility. Replacement of the paper and ink supply is achieved by simply opening the cartridge hatch 52, removing the old cartridge and inserting a new one. The cartridge includes pierceable ink outlets which engage nozzles on the ink distribution assembly connected with the printhead.

It will be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

What is claimed is:

1. A mobile telephone device including:
   a mobile telephone unit including:
      a first transmitter adapted to transmit data to a mobile telephony network;
      a first receiver adapted to receive data from a mobile telephony network;
   a printer mechanism adapted to receive document data and to print an interface onto a surface, the interface being at least partially based on the document data, the document data including identity data indicative of at least one identity, the identity being associated with a region of the interface, the interface including coded data.

2. The device of claim 1 further including a first sensor device adapted to sense the coded data and for generating first data from sensed coded data.

3. The device of claim 2 further including a second transmitter and a second receiver adapted to transmit data to and to receive data from one or more sensor devices, the sensor devices transmitting data.

4. The device of claim 1 further including a second transmitter and a second receiver adapted to transmit data to and to receive data from one or more sensor devices, the sensor devices transmitting data.

5. The device of claim 1 further including a transmitter controller adapted to cause the mobile telephone unit to transmit data based on the first data to a computer system via the first transmitter.

6. The device of claim 2 wherein the first sensor further includes a force sensor device including an operative element and a force sensor adapted to outputs a force signal indicative of a compressive force applied to the operative element.

7. The device of claim 1 further including controller operable to control said first transmitter to transmit data received by the second receiver from one or more sensor devices to a computer system via the mobile telephony network.

8. The device of claim 2 further including a decoder adapted to receive first data and to output decoded first data.

* * * * *